July 1, 1969  E. J. MELLEN, JR., ET AL  3,452,804
METHOD OF MAKING A PERMEABLE SHELL MOLD
Filed Dec. 2, 1965  Sheet 1 of 2

INVENTORS
EDWARD J. MELLEN JR.
EDMOND M. BAKER
JOHN M. WEBB
BY McCoy, Greene & Te Grotenhuis
ATTORNEYS July 1, 1969
E. J. MELLEN, JR., ET AL
3,452,804
METHOD OF MAKING A PERMEABLE SHELL MOLD
Filed Dec. 2, 1965
Sheet 2 of 2
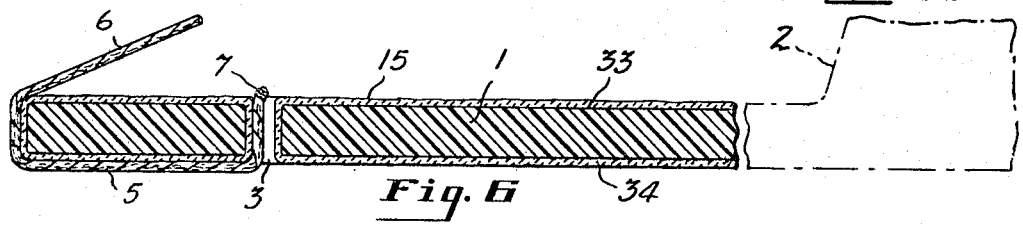
Fig. 6
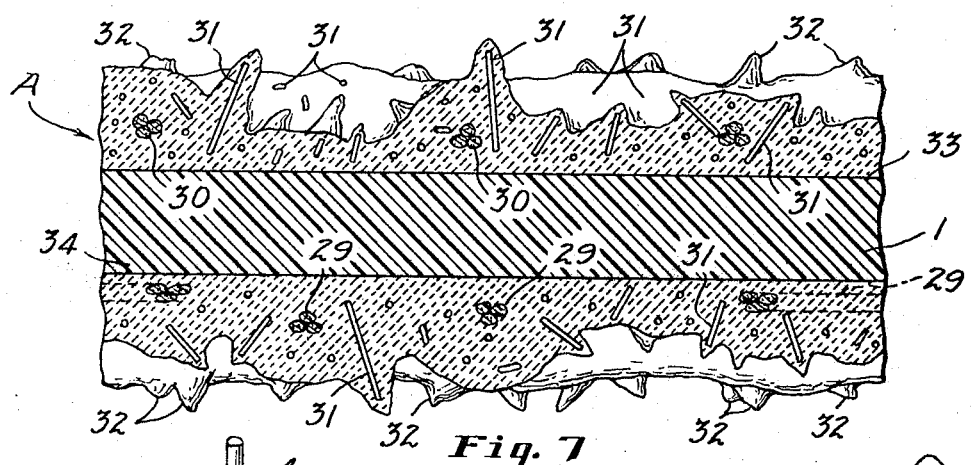
Fig. 7
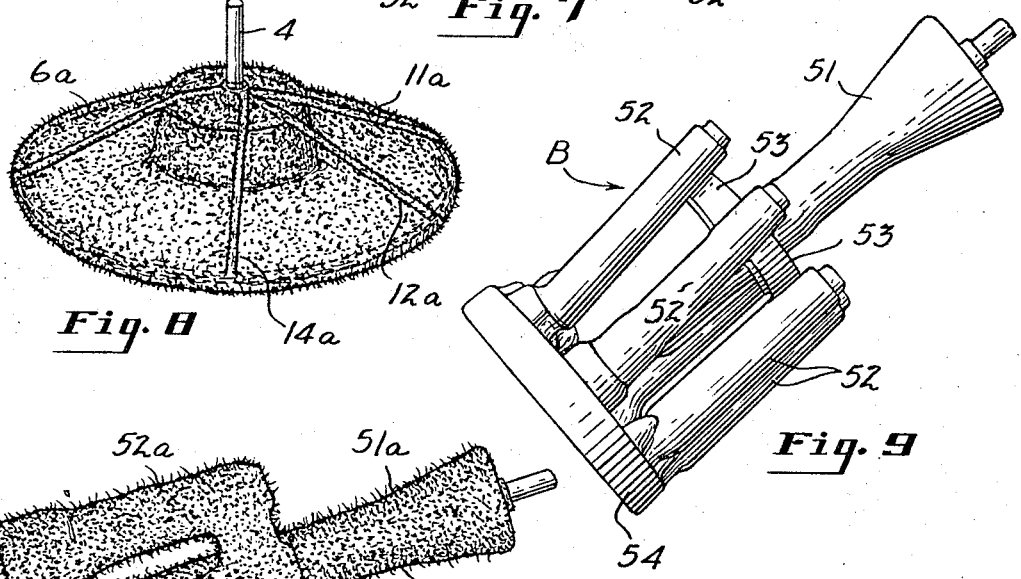
Fig. 8
Fig. 9
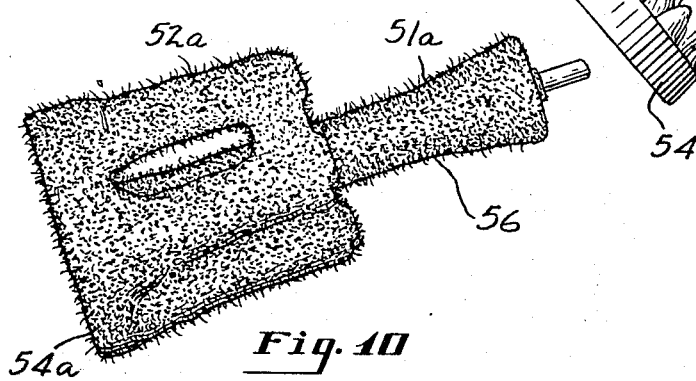
Fig. 10
INVENTORS
EDWARD J. MELLEN JR.
EDMOND M. BAKER
JOHN M. WEBB
BY McCoy, Greene + DeGrotenhuis
ATTORNEYS 3,452,804
METHOD OF MAKING A PERMEABLE
SHELL MOLD
Edward J. Mellen, Jr., 2123 Lee Blvd., East Cleveland,
Ohio 44112, and Edmond M. Baker, Alliance, and
John M. Webb, Chagrin Falls, Ohio; said Baker and
said Webb assignors to said Mellen
Filed Dec. 2, 1965, Ser. No. 511,129
Int. Cl. B22c 9/12
U.S. Cl. 164—26                                    21 Claims

ABSTRACT OF THE DISCLOSURE

A shell mold, ladle, crucible or the like made by dipping a destructible form or pattern in a ceramic slurry, randomly applying short threads to the resulting refractory layer so that they project outwardly from said layer in all directions, wrapping a destructible rope or cord around the ceramic-coated form or pattern to provide a closely spaced network, forming a series of ceramic coats which cover the network and the threads to form a ceramic article to substantial thickness by repeatedly dipping the pattern in the ceramic slurry, and firing the resulting ceramic article to burn out the rope. Where the threads are solid, they are formed of a destructible material so that they are burned out.

---

The present invention relates to the manufacture of investment shell molds having improved strength and permeability and more particularly to a process of making refractory shell molds on patterns made of wax, plastic, frozen mercury or other destructible material wherein the molds are wrapped in a destrucible rope cord and/or covered with destructible threads or fibers before all of the refractory layers are applied to the pattern.

Heretofore investment shell molds have been produced by repeatedly dipping a pattern of frozen-mercury, wax or other destructible material in a ceramic slurry and drying each layer to produce 4 to 10 or more layers with a total shell thickness of ¼ to ½ inch or more. If desired, each slurry layer was dusted with dry refractory particles before drying of that layer. After the mold was built up to the desired thickness, the pattern was removed in a suitable manner, as by melting or dissolving it, the mold was fired, and thereafter the mold was preheated and filled with molten metal to effect casting of the desired metal article.

In order to obtain satisfactory results by the shell molding process it was necessary to provide the mold with adequate strength, porosity and resistance to thermal shock and to provide the mold cavity with dimensional accuracy and proper surface finish. The "lost-wax" shell molding process was not satisfactory for making some types of articles, especially those of very large size, because these problems were not solved.

The problem of producing large shell molds economically with adequate green strength, porosity and resistance to cracking has been recognized for many years, but a simple and practical solution to this problem was not found prior to the present invention. It has now been discovered that excellent shell molds for very large castings can be made in a simple manner by employing destructible threads or fibers to reinforce the green mold, to improve the porosity of the mold, and to reduce the weight of the mold for a given wall thickness. The process of this invention improves both small and large shell molds and makes it possible to cast the metal at room temperature without preheating the shell mold, as was necessary prior to this invention, and without a backing for the shell mold.

When making shell molds by the process of this invention, the prime dip coats may be applied to the pattern in the usual manner, with or without dusting, to provide the shell mold with the desired internal surface characteristics. Thereafter, cords or threads of a suitable destructible material, such as a stiff natural or synthetic fibers are secured in outwardly projecting positions to the coated pattern, and additional layers of refractory material are applied in a conventional manner to build up the desired thickness of the shell wall. The destructible threads may be applied by a sprinkling or "flocking" operation after dipping the coated pattern in the ceramic slurry.

When making a large shell mold, it is preferable to apply a destructible fiber twine or other rope to the partially formed shell mold so that the ceramic slurry subsequently applied will pentrate the interstices thereof. The rope is preferably wound around the pattern to provide a network of closely spaced portions or strands reinforcing the mold, and additional destructible material is preferably sprinkled on the mold in the form of short threads or fibers to provide additional green strength and to improve further the porosity of the mold after firing. In this way it is possible to maintain dimensional accuracy and to avoid damage to the shell mold during the dipping, dusting, drying and pattern removal operations and to provide a durable mold which is strong enough for pouring of a very heavy casting, which can withstand high thermal shocks, and which, nevertheless, has very high permeability. Upon firing of the "green" shell mold, the rope or twine is burned leaving passages for flow of gas into or out of the mold. These passages are smaller than the external dimensions of the rope or twine because the ceramic material penetrates the interstices of the cord and, therefore, the passages do not weaken the mold but have a tendency to further strengthen it. The short destructible threads applied to the shell mold are also burned out to provide small passages for escape of gas from the mold during the metal casting operation.

The ceramic impregnated rope or twine and/or the destructible threads or fibers burn out much slower than a wax pattern and retain their strength long enough to resist cracking of the mold during the wax removal process.

If desired, the destructible rope or twine used in making the shell molds of this invention may be coated with an organic material of high boiling point, such as tar or pitch, to produce a reducing atmosphere during casting of the metal in the shell molds.

An object of the invention is to provide a simple, inexpensive, shell molding process for making large size precision metal castings which does not require expensive equipment.

A further object of the invention is to improve the permeability of shell molds and to speed up removal of gas from a shell mold when pouring molten metal into the mold.

Another object of the invention is to improve the green strength of shell molds and to avoid cracking of the molds.

Another object is to provide voids, left from the rope which permit passing any type of gas such as a reducing gas, through the mold just before or during casting.

Another object of the invention is to provide a mold reinforcement which does not interfere with bonding of one ceramic layer to the next and which burns out at a slower rate than the wax pattern so as to reinforce the mold during wax removal.

Another object is to provide a method of dewaxing which is more economical than the conventional flash firing method.

Another object of the invention is to prevent mold distortion and provide large precision castings with close tolerances.

A still further object of the invention is to eliminate the need for preheating of shell molds prior to metal casting.

Another object of the invention is to provide high strength investment shell molds suitable for vacuum casting.

These and other objects, uses and advantages of the invention will become apparent from the following description and claims and from the drawings, in which:

FIGURE 6 is a fragmentary vertical sectional view of the rope-reinforced pattern of FIGURES 2 and 3;

FIGURE 7 is an enlarged fragmentary sectional view of the shell mold made by the process of FIGURES 2 to 6 prior to firing of the mold;

FIGURE 8 is a perspective view of the completed shell mold made by the above process;

FIGURE 9 is a perspective view of another form of conventional wax pattern on a reduced scale; and FIGURE 10 is a perspective view of the finished shell mold formed on the wax pattern of FIGURE 9 by the process of this invention.

Figure 1:
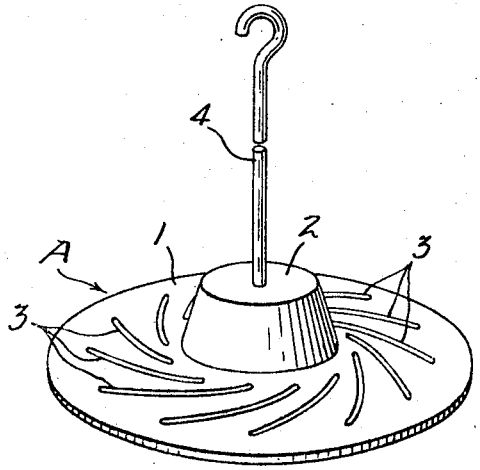
FIGURE 1 is a perspective view showing a conventional wax pattern on a reduced scale.

Referring more particularly to the drawings, FIGURE 1 shows a conventional wax pattern A in the form of a large turbine blade wheel having a flat disc-shaped portion 1, a tapered hub portion 2, and a series of regularly spaced curved blade slots 3 of generally uniform width. A conventional supporting hook 4 is embedded in the pattern.

In performing the process of this invention, one or two prime dip coats are applied to the wax pattern, and the coated pattern is then reinforced by a rope network, which may be applied by extending portions of the rope through the slots 3. FIGURES 2 through 6 show one way in which the reinforcing twine or other rope may be applied, it being understood that many other arrangements of rope are also suitable.

Figure 2:
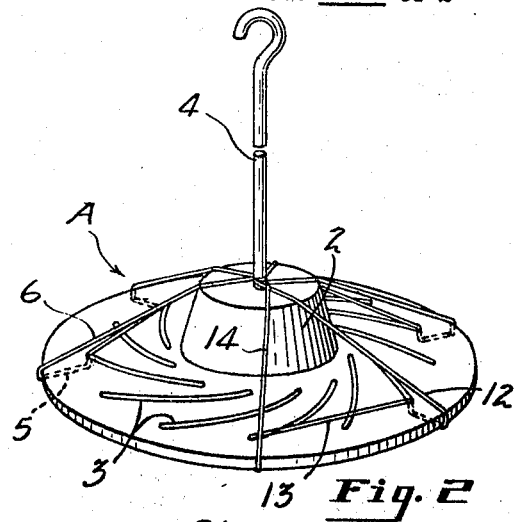
FIGURE 2 is a perspective view showing a ceramic-coated wax pattern with a supporting rope attached thereto according to the process of this invention.
Figure 3:
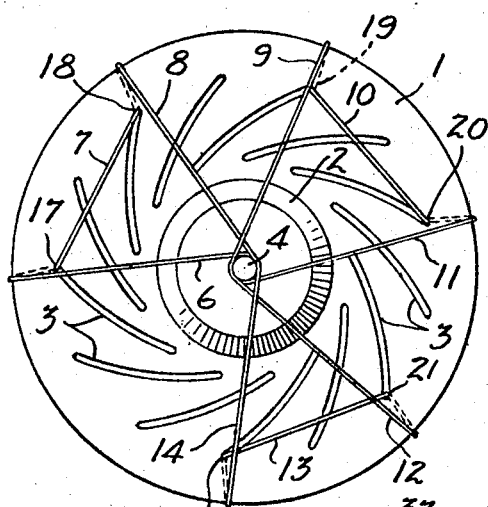
FIGURE 3 is a top plan view of the rope-reinforced pattern of FIGURE 2.

FIGURE 2 shows how supporting ropes may be attached to the base of the hook member 4. Thus, the rope may be extended radially outwardly from the base of the hook over the portion 1 to the outer margin of the pattern, under the pattern to the adjacent slot 3, and through that slot to another slot, thereby forming the three rope portions 5, 6 and 7 (see FIGURE 6). The rope portion 8 then returns to the hook 4 and remaining portions of the rope are used in a similar manner to form the radial portions 9, 11, 12 and 14 and the horizontal intermediate portions 10 and 13 as indicated in FIGURES 2 and 3. Although the intermediate portions 7, 10 and 13 are shown herein as effecting the attachment of the rope to the pattern, it will be apparent that the rope can be tied around the pattern in various other ways.

Figure 4:
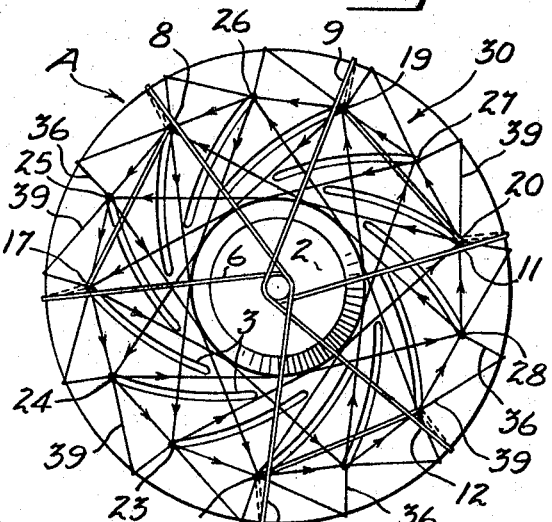
FIGURE 4 is a schematic top plan view similar to FIGURE 3 but showing the positions of reinforcing ropes forming a network on the top surface of the pattern.
Figure 5:
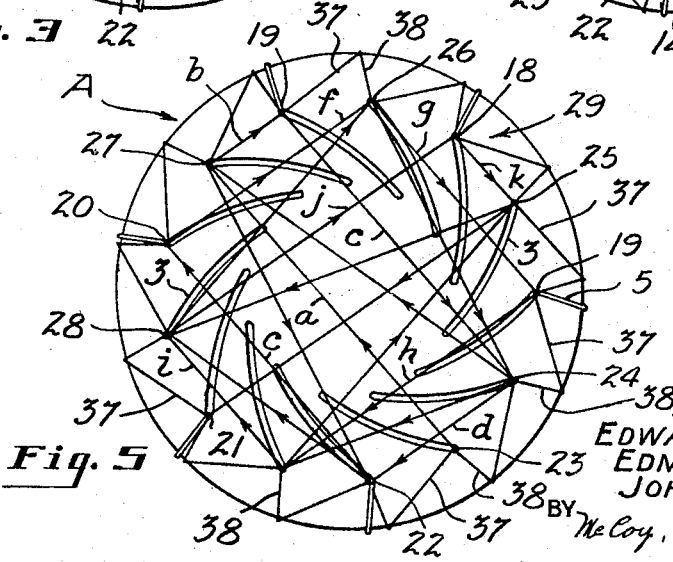
FIGURE 5 is a schematic bottom view of the rope-reinforced pattern of FIGURE 4 showing the rope network on the bottom surface of the pattern.

As shown diagrammatically in FIGURES 4 and 5, a rope network 29 is formed on the flat bottom surface of the pattern and a rope network 30 is formed on the flat upper surface of the disc portion 1. While the rope should be sufficiently taut, it should not be so tight that it could distort the pattern or crack the mold. The various ropes of the network are shown schematically by solid lines, the arrows indicating the direction in which the rope may be extended when it is applied. Obviously almost all of the two rope networks 29 and 30 may be formed from one long piece of twine or other rope, but more than one piece of rope is usually employed. Also, the networks may be preformed before being attached to the pattern if this is desired. Thus good results can be obtained using fishnets or the like with a spacing of ¼ inch to 1.5 inches between cords.

When applying the network as shown in FIGURES 4 and 5, the twine or other rope is extended through the outer ends of the slots 3 identified by the numerals 21 through 28 and around portions of the pattern to provide short marginal rope portions 36 and 38 adjacent the upper and lower surfaces, respectively, of the disc portion 1 and longer marginal rope portions 37 and 39 adjacent the lower and upper surfaces, respectively, of said disc portion. The rope portions 36 through 39 thus provide points of attachment at the slot ends 21 through 28.

It can readily be seen how a rope network may be formed by using such attaching points. Thus, as indicated in FIGURE 5, the network 29 is formed by extending one piece of rope from the slot end 23 to the end 27 to form the rope section $a$, extending it to end 19 to form section $b$, then extending it from 19 to 24 to form section $c$, and continuing to extend the rope past points 22, 20, 26, 17, 28, 18 and 25 to form the rope sections $d$ through $k$. Additional pieces of rope may be arranged in a generally similar manner to complete the network 29 as shown in FIGURE 5. The network 30 may be formed in a similar manner on the upper surface of the disc portion 1 using the attaching points 21 through 28 at said upper surface as shown in FIGURE 4. Portions of the rope may extend around the hub 2 to reinforce the pattern in this area, but this is not essential.

The rope sections of each network are preferably closely spaced, best results usually being obtained when the ropes are spaced apart about one to two inches. When practicing the present invention, it is desirable to divide the surface of the pattern into squares with a width of about 1½ inches, where it is convenient to do so, but, with some patterns, various other arrangements are preferred.

After the rope networks are applied to the upper and lower surface of the destructible pattern, the additional layers of ceramic material necessary to give the shell mold the desired thickness are applied in the conventional manner as described in more detail hereinafter, preferably after sprinkling short destructible threads or fibers over the pattern. The finished shell mold is shown in FIGURES 7 and 8, prior to firing of the mold.

The process of this invention is particularly well suited for use with wax patterns but may be used with patterns made of synthetic resins, mercury, mercury alloys or other destructible materials. Any conventional ceramic materials and binders may be employed to make the shell molds of this invention. Suitable ceramic slurries are disclosed, for example, in the following United States patents: 2,806,269, 2,818,619, 2,911,310, 2,913,729, 2,961,751, 2,932,864 and 3,160,931. Good results can be obtained using ceramic slurries of the general type disclosed in the copending allowed application of E. J. Mellen et al., Ser. No. 276,753, filed Apr. 30 1963, now Patent No. 3,222,435.

In order to obtain a good surface finish on the casting, it is desirable to use refractory granules in the prime dip and the first dusting operation which are much finer than those used in the later-applied concrete dip slurries. Thus, all of the refractory particles used in the prime dip slurry may, for example be small enough to pass through a 200-mesh sieve. However, the refractory material of the concrete dip slurry may, for example, be such that no more than 50 percent by weight can pass through a 200-mesh sieve and the remainder will pass through a 50-mesh sieve.

The refractory material used in each slurry may be any conventional ceramic material used for making shell molds including zirconite, fused silica, aluminum silicate, zirconium silicate, alumina, etc. and any conventional binder may be used such as ethyl silicate, colloidal alumina, sodium silicate, colloidal zirconsium, colloidal silica, etc. Both a low-temperature binder and a high-temperature binder may be employed as is well understood in the art.

The ceramic slurries may be applied by spraying or in any other suitable manner and may be dried in various ways with air or other gas. The preferred procedure is to dip the destructible pattern in the slurry and to evaporate the water or other slurry vehicle in air having a predetermined humidity and temperature. When using wax patterns it is desirable to effect dusting and drying using the process of U.S. Patent No. 2,932,864.

The term "drying" is used herein in the normal sense to describe the evaporation of most of the slurry vehicle and does not require removal of 100% of the liquid. The amount of drying should be sufficient to permit proper application of the next ceramic layer.

Although the ceramic slurry used for forming shell molds on the wax patterns may be any of the conventional materials used for this purpose, it is necessary to provice a slurry of the proper consistency. If a slurry is too thick, this can cause building up the thickness of the layers on the mold too rapidly. If, for example, the slurry contains too much of an organic material, such as synthetic resin, it may be unsatisfactory. For this reason such resins are preferably omitted and, if used in very small amounts.

Conventional hydrolyzed solutions of ethyl silicate are excellent for use in practicing the present invention although various other binders are equally suitable. The ethyl silicate type of binder usually comprises about 30 to 60% by weight of ethyl silicate (about 30 to 40% $SiO_2$), about 30 to 60% alcohol, about 0.05 to 0.5% concentrated hydrochloric acid, and about one to 10% of water. One part by weight of such binder is usually mixed with about 2.5 to 4.5 parts by weight of the dry refractory material. Various catalysts and/or accelerators may be employed with the ethyl silicate binder including magnesium oxide, aluminum oxide, aluminum hydroxide, ammonium carbonate, ammonium acetate, morpholine, etc. Each ceramic layer of the shell mold made by the process of this invention is preferably made by applying the slurry to the pattern, draining off the excess slurry, and applying a stucco coat before drying the layer in a suitable dusting apparatus. The dusting steps speed up the formation of the shell mold, but it will be understood that dusting is not essential in the practice of this invention. It will also be apparent that any suitable method may be employed to evaporate the slurry vehicle from the individual ceramic layers and that each layer does not have to be dried 100% before applying the next layer. It is preferred to dry the mold rapidly using equipment of the type disclosed in said U.S. Patent No. 2,932,864, but the patterns may be dried slowly, particularly when they are extremely large.

In practicing the process of the present invention, a typical procedure is to apply one or two prime dip layers to the pattern before applying the reinforcing ropes or the destructible threads, each layer being formed by dipping the destructible pattern in the prime dip slurry, draining the excess slurry, dusting with fine ceramic particles and drying the individual layer in air or other gas. After the second layer is dried, the pattern may be dipped in the concrete slurry or the prime dip slurry, just prior to the application of the destructible threads. If reinforcing ropes are to be employed, then these are preferably applied before the flocking operation is performed. After the pattern has been covered with the destructible fibers, conventional air drying may be employed with or without dusting. Thereafter several ceramic layers are preferably built up over the destructible threads or the reinforcing rope or both in a conventional manner to provide the shell mold with the desired thickness. The total number of layers may vary from 4 to 10 or more. Usually each of the concrete slurry layers is formed by dipping the pattern in the concrete slurry, draining the excess slurry, dusting with coarse refractory particles, and evaporating the slurry vehicle with air. Dusting is preferably omitted after the last dip coat. In some cases post-fired dip coats may be used.

In practicing the present invention, it is preferable to apply the rope and/or the destructible threads or fibers after only one or two ceramic layers have been formed on the destructible pattern so that most of the layers of ceramic material are built up over the rope and/or the destructible fibers; however, it will be understood that more than one flocking operation can be employed and that the rope can be applied at different times during the building of the shell mold.

The twine or other rope and the short threads or filaments used in making the permeable shell molds of this invention may be formed of various destructible materials, such as natural and synthetic fibers or various metals. The fibrous material used may be cotton, wool, hair, silk, ramie, flax, hemp, jute, sisal, abaca, catgut, seaweed, cattail, milkweed, straw, grass, redwood bark, or other fibers of vegetable, mineral or animal origin. The fibrous material may be a protein fiber, such as one made from casein, soybeans, peanuts or corn, a cellulosic fiber such as viscose rayon or various other synthetic fibers or threads made from ceramic, polystyrene, polyethylene, polyvinyl alcohol, cellulose acetate, cellulose butyrate, ethyl cellulose, acetate butyrate, polyamides such as nylon, vinyl resins, polyester resins, polyacrylic resins, natural rubber, synthetic rubbers, acetate rayon, polycaprolactam, or the like. The threads or filaments used in making the shell molds of this invention may also be common textile fibers or metal filaments which are chemically treated or coated with wax, ceramic or any other suitable material, such as a synthetic resin.

The metal used to form the rope or twine or the threads or filaments may be aluminum, brass, steel, iron, etc. It may, for example, be black iron or a metal with a low coefficient of expansion, such as a nonexpanding stainless steel. Good results can be obtained using wires or filaments made of a metal treated to form an oxide film on the surface.

The rope or twine is preferably a hemp rope, nylon rope, binder's twine or the like and usually has a diameter of about 0.08 to 0.2 inch. If desired, the rope may be treated with asphalt, coal tar pitch or other suitable organic material to produce a reducing atmosphere in the mold when casting the metal. The amount of such material, of course should not be excessive.

If the destructible material used to form the threads or fibers used in reinforcing the molds of this invention is not sufficiently stiff, it is possible for the threads to become matted or flattened on the surface of the coated pattern. This would cause weakening of the mold by interfering with the adhesion of subsequent ceramic layers and would not produce a satisfactory mold. Therefore, when using a material which is not stiff, the individual threads, fibers or filaments should be treated to obtain adequate stiffness as by coating with a synthetic resin or other suitable material. Of course such treatment is unnecessary when using stiff fibers, such as those made of hemp, jute, sisal, bassine, Tampico, redwood bark, straw or the like.

In practicing the process of this invention, fibers or filaments are used with a length of ¼ to 1 inch or so having sufficient stiffness so as to remain in an outwardly projecting position when subsequent layers of ceramic material are applied, whereby the individual threads project through several layers of the ceramic material and help to prevent separation of the layers. Although minor amounts of fibers with a length somewhat less than ¼ inch can be used in the practice of this invention, it is preferable to eliminate extremely short fibers because of their tendency to lay flat on the surface and interfere with adhesion of the next ceramic layer. Best results are usually obtained with fibers or filaments with a length of 0.4 inch to 1 inch.

To facilitate an understanding of the present invention, an example of the process of this invention is given below. A liquid carrier of prehydrolyzed ethyl silicate is prepared by mixing 5300 milliliters of ethyl silicate 40 (about 40% $SiO_2$) with 4200 milliliters of ethyl alcohol and 500 milliliters of 1% hydrochloric acid. One part by weight of the resulting liquid carrier is then thoroughly mixed with 3 parts by weight of a conventional dry mix consisting of 65% by weight of zircon flour and 35% by weight of fused silica flour. Said flours are of a size to pass through a 325-mesh screen (standard Tyler sieve). The resulting ceramic slurry is employed as a prime dip slurry as indicated below.

In order to provide a concrete dip slurry containing a coarser refractory, the prehydrolyzed ethyl silicate prepared as indicated above is mixed with a coarse fused silica flour which will pass through a 120-mesh sieve. About one part by weight of the prehydrolyzed ethyl silicate solution is mixed with around 3 parts of the coarse silica flour and preferably with an amount which will provide a viscosity of 14 to 16 seconds using a standard #4 Zahn cup.

In forming the shell mold of this invention, the wax pattern A of FIGURE 1 is immersed in a dip tank containing the prime dip slurry described above, the solids preferably being kept in suspension (i.e., by rotating the tank continuously at a speed of about 30 r.p.m.). After dipping, the pattern is given a stucco coat and is air dried according to the method of said U.S. Patent No. 2,932,864. The dry refractory used for the first stucco coat is conventional and comprises 62.5 percent by weight of fused silica (−50 +100 mesh) and 37.5 percent by weight of zircon sand (−80 +200 mesh). After the first dipping, dusting and drying operation, the pattern is again dipped in the same prime dip slurry, dusted with the same dry refractory material and air dried in the same way and a ⅛-inch hemp twine (2-strand binder's twine) is mounted on the pattern over the resulting ceramic coating 15 as indicated in FIGURES 2 to 6.

After the hemp twine is applied, the rope-reinforced pattern is dipped, for example, in a rotating dip tank containing the concrete dip slurry described above and a stucco coat is applied by dusting using a suitable apparatus as disclosed in said Patent No. 2,932,864 but using a coarser refractory of a conventional type made by mixing 3 parts by weight of fused silica grains (−30 +50 mesh) with 4 parts of calcined clay or grog (i.e., aluminum silicate). Of course, any coarse stucco material conventionally used for this purpose may be employed.

After the stucco is applied, air drying is effected according to the process of said Patent No. 2,932,864, and the pattern is again dipped in the same concrete slurry. Then the wet coated pattern is flocked by sprinkling ordinary bassine fibers with a length of about ½ inch over the entire outer surface of the coated pattern in such a manner that the fibers adhere to the wet ceramic outer layer and project outwardly therefrom. The application of the fibers may be effected using a conventional rotary dusting apparatus, such as that disclosed in said Patent No. 2,932,864, having buckets rotating with the drum which drop or sprinkle the fibers over the pattern. The pattern may be rotated by hand as the fibers are applied, but this is not essential. After the fibers have been deposited on the wet surface, the pattern is again dipped in the concrete slurry, the excess slurry is drained off, and the wet pattern is dusted with the coarse ceramic particles and dried as before.

The dipping in the concrete slurry, the dusting with ceramic particles and the drying may be repeated to build up a total of 10 layers or so. Then the pattern is dipped in a ceramic slurry and dried without dusting to provide a final seal coat. The resulting shell mold is relatively thick in the vicinity of the individual rope sections and has a very irregular outer surface because of the projecting fibers 31 which project outwardly in all directions. FIGURE 7 gives a general idea of the irregular shape of the shell mold prior to firing, it being understood that there are an infinite number of variations in the shape depending on the way in which the ropes and fibers are located.

As indicated in FIGURE 7, the reinforcing ropes of the network 30 are located near the upper surface 33 of the pattern and the ropes of the network 29 are located a short distance below the lower surface 34 of the pattern, the fibers 31 being closely spaced throughout the shell mold and providing a multiplicity of closely spaced projections 32 in the outer surface, said projections extending in all directions in a random fashion. Where the supporting rope sections 6 to 14 are employed, the radially extending sections will also be coated with refractory material to provide radial arms, such as the arms 6a, 11a, 12a and 14a.

The dried shell mold made as described above is then flash fired in a conventional manner at 1850° F. to effect removal of the wax and cooled to room temperature. This heating burns out the rope and the bassine fibers. However, the rope retains its strength longer than the wax and reinforces the mold so as to prevent cracking of the mold (i.e., due to expansion of the wax).

The completed mold need not be preheated to effect casting of the metal as with conventional shell molds. Instead the metal may be poured into the mold while the mold is at room temperature. After pouring, the mold is cooled and the shell is broken away from the cast metal part.

Prior to this invention, it was conventional to preheat the shell molds to about 1800° F. when pouring the metal at around 3000° F. The disadvantage of the preheating is that it requires an extra heating operation and sometimes tends to cause a reaction between the metal being cast and the material forming the mold. The process of this invention eliminates the need for the preheating operation and eliminates the metal mold reaction. Such preheating was necessary with conventional shell molds to facilitate removal of moisture and removal of air from the mold. This is not necessary with the mold of this invention because of the greater porosity of the mold caused by the ropes and fibers which burn out to leave voids in the wall of the mold and the reduced thickness of the shell mold between rope sections. Also, because of the strong waffle-type wall structure it is unnecessary to provide a backing for the shell mold of this invention when casting the metal. While maximum reinforcement is obtained using ropes as disclosed, for example, in FIGURES 2 to 8, a very substantial reinforcement of the mold is obtained using fibers alone. FIGURES 9 and 10 illustrate this process when using a conventional wax pattern B in the form of a tree or cluster. The pattern B has a tapered central portion 51 of circular cross section having embedded therein a supporting hook 50. The pattern has a series of pattern members 52 of circular cross section regularly spaced around the circumference of the pattern B and held in position by a series of connecting portions 53 and a circular base portion 54. The pattern B is conventional and forms no part of this invention.

An example of the process of this invention using fibers only as the reinforcement is given below. The pattern B is dipped in the prime dip slurry, the excess slurry is drained off, a stucco coat is applied by dusting, using the fine ceramic material described above, and the coated pattern is air dried as described in the previous example. The dipping, draining, dusting and drying is repeated to form a second prime dip layer. Then the pattern B is dipped in the rotating dip tank containing the concrete dip slurry described above, the excess slurry is drained off and ½-inch bassine fibers 56 are sprinkled over the entire outer surface of the pattern by the method of the previous example so that the fibers project outwardly from the surface and do not interfere with adhesion of subsequent layers. The wet coated pattern is then air dried, and seven layers of concrete slurry are applied to complete the mold as shown in FIGURE 10. Each concrete layer is applied in the conventional manner by dipping in the concrete ceramic slurry, draining off the excess slurry, dusting with the coarse ceramic particles described above and air drying in the usual manner. The dusting operation is omitted when the last coat is applied.

The resulting shell mold is then flash fired at 1850° F. to effect wax removal. The mold is then cooled to room temperature, and molten metal is poured into the mold to form the desired metal casting. It is to be understood that the mold can be preheated to an elevated temperature before pouring, if so desired.

The fibers do not interfere with bonding of one ceramic layer to the next because they do not lay flat but project outwardly through the different layers. Thus, they act like nails to hold the layers together and strengthen the mold instead of weakening it, as would be the case if resinous particles were mixed with or sprinkled on the ceramic material. The fibers greatly increase the strength of the mold in the green state and, because they burn out slower than the wax, they reinforce the mold to prevent cracking during wax removal.

Prior to this invention, steam degreasing or dewaxing was considered impractical because it cracked or damaged too many molds. The rope and fiber-reinforced shell molds of this invention resist such cracking and make it practical to disintegrate the pattern at atmospheric pressure using steam at a temperature in the neighborhood of 212° F. This permits use of more economical wax removal processes.

Heretofore, it was difficult to produce large castings having portions extending outwardly a substantial distance from a central support. In order to make shell molds for such castings on destructible patterns, it was considered necessary to provide a gating system wherein the gates were located at the margin of the article so as to function with a steel framework to provide support for the mold. This was expensive because of the cost of the additional wax and ceramic material, the special brackets or other framework, and the extra metal used during casting. The process of this invention eliminates the need for a wax pattern of such special construction and greatly reduces the cost of manufacture of large precision castings while making it possible to maintain close tolerances.

In practicing the present invention, use may be made of a twine or other rope which can absorb a substantial amount of the ceramic material. An advantage of having the ceramic material penetrate the rope is that the rate of burning of the rope is reduced. Thus, the rope is able to retain its strength for a longer period of time during removal of the wax or other destructible material to prevent cracking of the mold.

While the process of this invention is usually applied to the making of the more common types of investment shell molds it will be understood that it may be applied to crucibles used in induction furnaces for melting the metal, to ladles used to transport the molten metal from the furnace to the refractory molds and to other refractory articles. Thus where a crucible or ladle is made according to the process of U.S. Patent No. 2,932,864, its strength may be increased by the use of rope and/or fibers according to the process of the present invention.

The present invention may be practiced using any of the known binder systems and any of the known types of destructible patterns including frozen mercury patterns. The gelling of the ethyl silicate may, for example, be effected by use of ammonia vapors. Excellent shell molds may, for example, be made by the alternate dip method wherein each ceramic layer formed from the ethyl silicate slurry is followed by a layer formed from a colloidal silica slurry.

Unless the context shows otherwise, all percentages given herein are by weight and "parts" means parts by weight.

It will be understood that the above description is by way of illustration rather than limitation and that, in accordance with the provisions of the patent laws, variations and modifications of the specific compositions, methods and products disclosed herein may be made without departing from the spirit of the invention.

Having described our invention, we claim:

1. In a metal casting process wherein a plurality of stucco and dip coats of finely divided ceramic material are built up onto the surface of a destructible pattern to form a refractory shell and such shell is fired to provide a hardened mold, the improvement which comprises wrapping a destructible rope around the ceramic-coated pattern to provide crossing sections of said rope, and forming a series of layers of ceramic material on the pattern which cover the rope and penetrate the interstices of the rope.

2. A process of making a refractory shell mold for investment casting from at least one ceramic slurry containing a liquid vehicle, finely divided refractory particles and a heat-setting binder comprising the steps of applying a ceramic slurry to a destructible pattern, evaporating the slurry vehicle from the pattern, placing a destructible reinforcing cord around the pattern, thereafter applying a ceramic slurry and causing it to penetrate the interstices of said cord, evaporating the slurry vehicle, repeating the application of ceramic material to build up a series of layers of refractory material on the cord, and firing the mold to burn out the cord.

3. A process as defined in claim 2 wherein said reinforcing cord is covered with an organic material of high boiling point to provide a reducing atmosphere when molten metal is poured into the finished mold.

4. A process of forming a multilayer refractory shell mold comprising dipping a destructible pattern of a predetermined shape in a ceramic slurry, applying short destructible threads to the resulting outer refractory layer in closely spaced relation throughout said layer so that the threads project radially outwardly from said layer, wrapping a destructible rope around the ceramic-coated pattern, forming a series of ceramic coats which cover said rope and said threads to form a mold of substantial thickness by repeatedly dipping the pattern in the ceramic slurry, and firing the resulting shell mold to form voids where said rope and said threads were located.

5. A process of forming a multilayer refractory shell mold comprising repeatedly dipping a destructible pattern in a ceramic slurry and applying short destructible threads to the wet outer layer so that the threads project radially outwardly from said outer layer in closely spaced relation throughout said layer, the threads being maintained in outwardly projecting positions during forming of the shell mold, and thereafter firing the resulting shell mold to burn out the destructible threads.

6. A process as defined in claim 5 wherein a rope is applied to the ceramic-coated pattern to support and reinforce it during forming of the shell mold and during destruction of the pattern.

7. A process as defined in claim 5 wherein a rope is wrapped around the ceramic-coated pattern during forming of the mold to provide crossing sections of said rope and said rope is repeatedly dipped in the ceramic slurry to provide a relatively thick mold wall.

8. A process of making a refractory shell mold for investment casting from at least one ceramic slurry containing a liquid vehicle, finely divided refractory particles and a heat-setting binder comprising the steps of applying a ceramic slurry to a destructible pattern, evaporating the slurry vehicle, thereafter applying a long destructible rope to the coated pattern with a large number of closely spaced portions arranged in a reticulate manner, and covering the rope with a series of ceramic layers by repeatedly applying a ceramic slurry to the rope-covered pattern and evaporating the slurry vehicle.

9. A process as defined in claim 8 wherein the pattern is flocked with destructible fibers of substantial length after the ceramic slurry is applied to the pattern.

10. In an investment casting process wherein a series of ceramic layers are built up onto the surface of a destructible pattern of predetermined shape by repeatedly applying a ceramic slurry and evaporating the slurry vehicle to form a multi-layer refractory shell mold suitable for casting molten metal, the improvement which comprises: wrapping a destructible fiber cord around a destructible pattern after applying a layer of ceramic material to the pattern, sprinkling destructible threads on the coated pattern, and thereafter applying a plurality of layers of additional ceramic material.

11. A process as defined in claim 10 wherein the destructible cord is arranged on the pattern to provide a network of crossing strands.

12. In a metal casting process wherein a plurality of stucco and dip coats of finely divided ceramic material are built up onto the surface of a destructible pattern to form a refractory shell, and such shell is fired to provide a hardened mold from which the destructible material of said pattern is removed and wherein a metal in a molten state is poured into the fired shell mold to produce a metal casting, the improvement which comprises: applying short threads in closely spaced relation throughout the outer surface of the coated pattern with the ends of the threads projecting outwardly from the pattern, thereafter applying a plurality of layers of the ceramic material, and firing the mold.

13. A process as defined in claim 12 wherein said threads are formed of metal and are covered by a metal oxide coating.

14. A process as defined in claim 12 wherein the threads consist of straw.

15. A process as defined in claim 12 wherein the threads comprise refractory tubes.

16. A process as defined in claim 15 wherein the threads comprise filaments coated with ceramic material.

17. A process as defined in claim 12 wherein the threads comprise metal filaments coated with a destructible material.

18. A process as defined in claim 12 wherein the threads are solid and have a length of about ¼ inch to about 1 inch.

19. A process of forming a multilayer shell mold around a destructible pattern of a predetermined shape comprising forming an initial refractory coat around said pattern, thereafter adhering destructible threads to the outer refractory layer in closely spaced relation throughout said outer layer, forming a plurality of refractory coats which cover said threads, and firing the resulting shell mold to form a mold cavity, to harden the mold, and to form voids where said threads were located, thereby facilitating removal of gas from the mold when molten metal is poured into the mold cavity.

20. A process of forming a multilayer refractory article comprising applying a ceramic slurry to a pattern, said slurry containing a liquid vehicle, providing short destructible threads in the resulting outer refractory layer arranged in random fashion so that the threads project outwardly from said layer, forming a destructible rope network around the pattern, forming a series of ceramic coats which cover said rope and said threads to form a ceramic wall of substantial thickness surrounding said pattern by repeatedly applying the ceramic slurry to the pattern and evaporating the slurry vehicle, removing the pattern and heating the ceramic wall to burn out the rope and the threads.

21. A process as defined in claim 12 wherein said threads are formed of natural fibers.

References Cited

UNITED STATES PATENTS

| | | | |
|---|---|---|---|
| 2,679,669 | 1/1954 | Kempe | 164—41 X |
| 3,037,252 | 6/1962 | House et al. | 164—23 |
| 3,066,365 | 12/1962 | Moore | 164—43 X |
| 3,077,648 | 2/1963 | Sutherland | 164—26 |
| 3,112,541 | 12/1963 | Bohm et al. | 164—24 |
| 3,266,106 | 8/1966 | Lirones | 164—361 X |

FOREIGN PATENTS

| | | |
|---|---|---|
| 903,502 | 8/1962 | Great Britain. |
| 302,619 | 1/1955 | Switzerland. |

J. SPENCER OVERHOLSER, *Primary Examiner.*

EUGENE MAR, *Assistant Examiner.*

U.S. Cl. X.R.

164—34, 41, 361